(12) United States Patent
Ravenscroft

(10) Patent No.: US 9,513,125 B2
(45) Date of Patent: Dec. 6, 2016

(54) COMPUTING ROUTE PLANS FOR ROUTING AROUND OBSTACLES HAVING SPATIAL AND TEMPORAL DIMENSIONS

(75) Inventor: Donald L. Ravenscroft, Broomfield, CO (US)

(73) Assignee: The Boeing Company, Chicago, IL (US)

( * ) Notice: Subject to any disclaimer, the term of this patent is extended or adjusted under 35 U.S.C. 154(b) by 799 days.

(21) Appl. No.: 13/300,444

(22) Filed: Nov. 18, 2011

(65) Prior Publication Data

US 2012/0158280 A1    Jun. 21, 2012

Related U.S. Application Data

(63) Continuation-in-part of application No. 12/013,582, filed on Jan. 14, 2008, now Pat. No. 8,082,102.

(51) Int. Cl.
| G06F 17/10 | (2006.01) |
| G06G 7/78 | (2006.01) |
| G01C 21/00 | (2006.01) |
| G01C 21/20 | (2006.01) |
| G05D 1/10 | (2006.01) |
| G08G 5/00 | (2006.01) |

(52) U.S. Cl.
CPC ............ *G01C 21/005* (2013.01); *G01C 21/20* (2013.01); *G05D 1/101* (2013.01); *G08G 5/0034* (2013.01); *G08G 5/0069* (2013.01)

(58) Field of Classification Search
CPC combination set(s) only.
See application file for complete search history.

(56) References Cited

U.S. PATENT DOCUMENTS

| 5,596,332 A | | 1/1997 | Coles et al. | |
| 5,631,640 A | * | 5/1997 | Deis | F41G 7/343 340/961 |
| 5,706,011 A | * | 1/1998 | Huss | G01C 21/005 342/65 |
| 6,085,147 A | * | 7/2000 | Myers | G01C 21/3453 342/33 |
| 6,161,063 A | * | 12/2000 | Deker | G05D 1/0615 244/180 |
| 6,259,988 B1 | * | 7/2001 | Galkowski | G01C 21/00 340/989 |
| 6,266,610 B1 | * | 7/2001 | Schultz | G05D 1/101 701/528 |
| 6,421,603 B1 | * | 7/2002 | Pratt | G01C 21/00 244/175 |
| 6,571,155 B2 | | 5/2003 | Carriker et al. | |

(Continued)

OTHER PUBLICATIONS

ARINC Navigation System Data Base (NDB) International Standard, ARINC, Supplement 18, Version 13 obtained from www.arinc.com/cf/store/catalog_detail.cfm?item_id=645, 1 pages, dated Jul. 3, 2008.

(Continued)

*Primary Examiner* — Bhavesh V Amin
(74) *Attorney, Agent, or Firm* — McDonnell Boehnen Hulbert & Berghoff LLP

(57) ABSTRACT

This description provides tools and techniques for computing a route or flight plans for unmanned aerial vehicles (UAVs) or any vehicle while routing around obstacles having spatial and temporal dimensions. Methods provided by these tools may receive data representing destinations to be visited by the UAVs, and may receive data representing obstacles having spatial and temporal dimensions. These methods may also calculate trajectories spatial and temporal dimensions, by which the UAV may travel from one destination to another, and may at least attempt to compute flight plans for the UAVs that incorporate these trajectories. The methods may also determine whether these trajectories intersect any obstacles, and at least attempt to reroute the trajectories around the obstacles. These tools may also provide systems and computer-readable media containing software for performing any of the foregoing methods.

20 Claims, 7 Drawing Sheets

(56) References Cited

U.S. PATENT DOCUMENTS

| | | | |
|---|---|---|---|
| 7,737,878 B2 | 6/2010 | van Tooren et al. | |
| 8,082,102 B2* | 12/2011 | Ravenscroft | G01C 21/005 701/2 |
| 2003/0093219 A1* | 5/2003 | Schultz | G05D 1/0005 701/533 |
| 2005/0071206 A1* | 3/2005 | Berge | G06Q 10/047 705/6 |
| 2005/0216182 A1* | 9/2005 | Hussain | G01C 21/20 701/532 |
| 2009/0027253 A1 | 1/2009 | van Tooren et al. | |
| 2009/0210109 A1* | 8/2009 | Ravenscroft | G01C 21/005 701/26 |
| 2010/0094485 A1 | 4/2010 | Verlut et al. | |
| 2010/0121575 A1 | 5/2010 | Aldridge et al. | |

OTHER PUBLICATIONS

ARINC Navigation System Data Base (NDB) International Standard, ARINC, Supplement 18, Version 15 obtained from www.arinc.com/cf/store/catalog_detail.cfm?item_id=715, 1 pages, dated Jul. 3, 2008.

ARINC Navigation System Data Base (NDB) International Standard, ARINC, Supplement 18, Version 18 obtained from www.arinc.com/cf/store/catalog_detail.cfm?item_id=609, 1 page, dated Jul. 3, 2008.

Beaton et al., "Real-Time Mission and Trajectory Planning," Proceedings of the 26th IEEE Conference on Decision and Control, IEEE Control Systems Society, Dec. 9-11, 1987, Los Angeles, California; 8 pages.

Christofides, Nicos, Graph Theory—An Algorithmic Approach, Academic Press, New York, 1975, p. 244.

Christofides, Nicos, Graph Theory—An Algorithmic Approach, Academic Press, New York, 1975, pp. 255 and 266.

Garey, Micheal, R. And Johnson, David S.,"Computers and Intractability—A Guide to the Theory of NP-Completeness", W.H. Freeman and Company, New York, 1979, p. 35.

PCT International Search Report of the International Search Authority in International Application No. PCT/US2008/081413 dated Mar. 20, 2009; 3 pages.

Protter, Murry H. and Morrey, Charles B., Jr., College Calculus with Analytical Geometry, Addison Wesley Publishing Company, 1970, p. 579.

\* cited by examiner

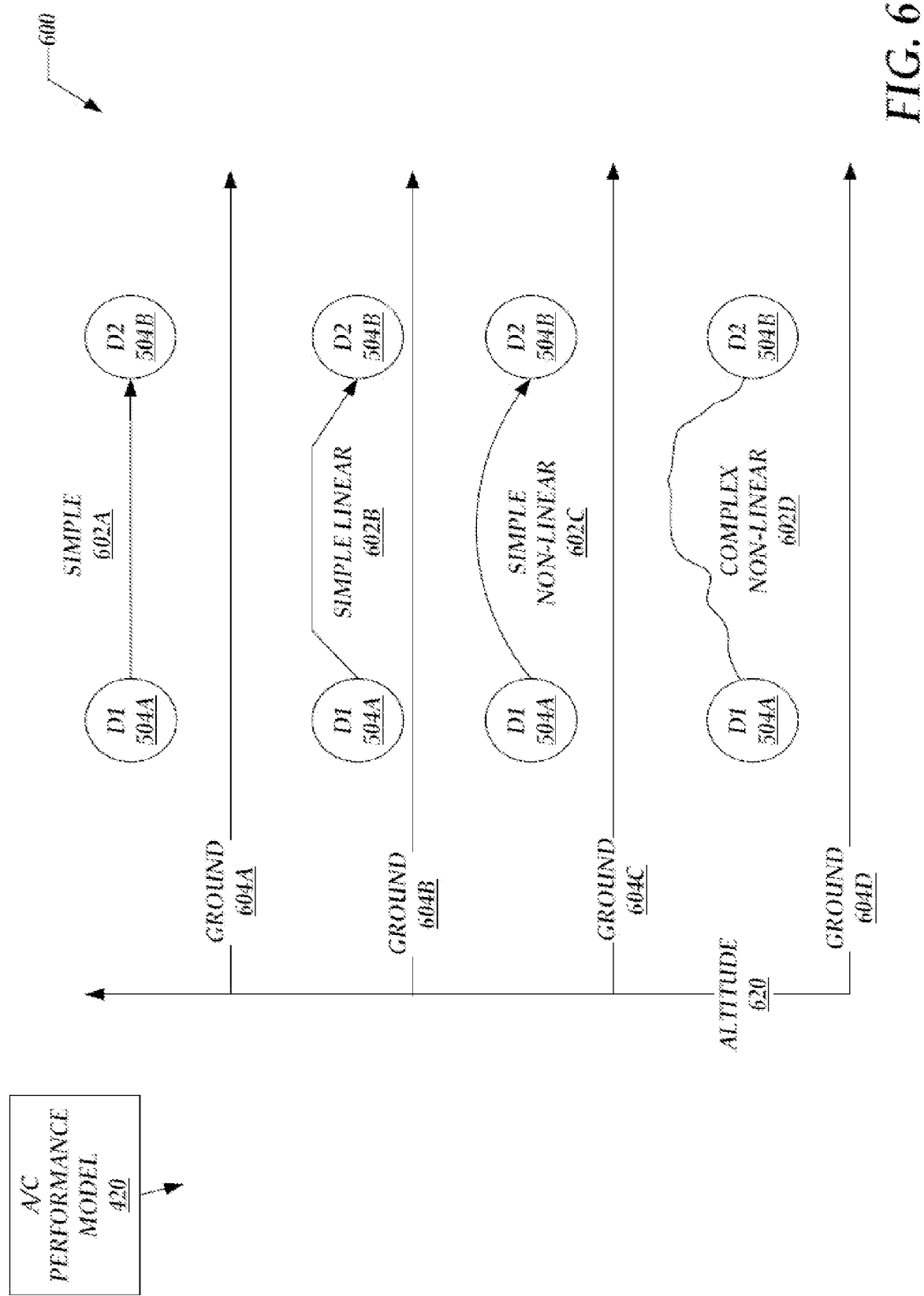

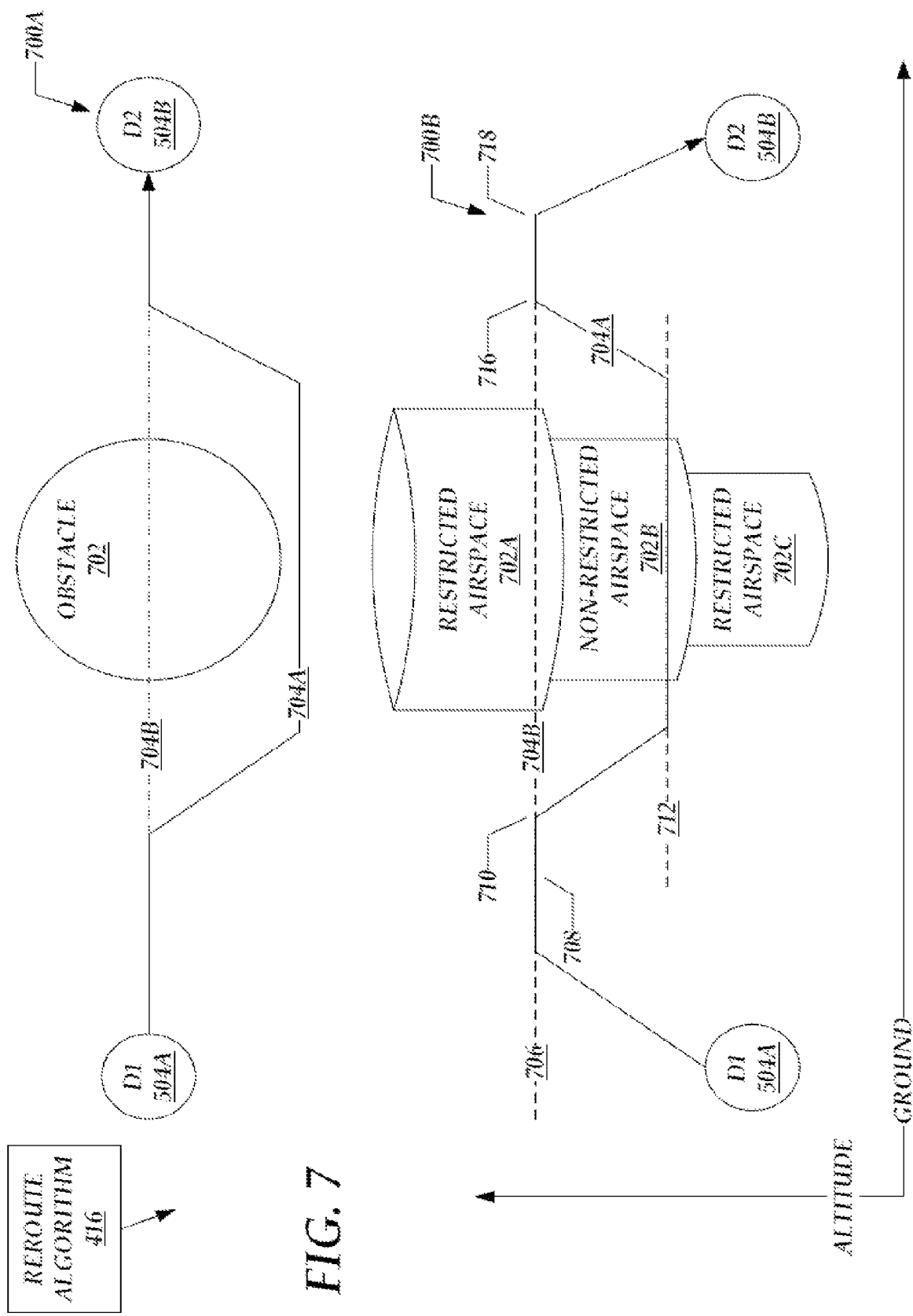

COMPUTING ROUTE PLANS FOR ROUTING AROUND OBSTACLES HAVING SPATIAL AND TEMPORAL DIMENSIONS

CROSS-REFERENCE TO RELATED APPLICATION

This application claims priority under U.S.C. 120 to and is a Continuation-in-part application of U.S. patent application Ser. No. 12/013,582, filed 14 Jan. 2008 now U.S. Pat. No. 8,082,102, content of which is incorporated herein by reference in its entirety.

BACKGROUND

Unmanned aerial vehicles (UAVs) are seeing increasing use in a variety of different applications, whether military, private, or commercial. Typically, these UAVs are programmed to visit one destination and one mission. More recently, UAVs are being programmed to visit a variety of different destinations in the course of performing different functions.

SUMMARY

It should be appreciated that this Summary is provided to introduce a selection of concepts in a simplified form that are further described below in the Detailed Description. This Summary is not intended to be used to limit the scope of the claimed subject matter.

This description provides tools and techniques for computing a route or flight plans for unmanned aerial vehicles (UAVs) or any vehicle while routing around obstacles having spatial and temporal dimensions. Methods provided by these tools may receive data representing destinations to be visited by the UAVs, and may receive data representing obstacles having spatial and temporal dimensions. These methods may also calculate trajectories having spatial and temporal dimensions, by which the UAV may travel from one destination to another, and may at least attempt to compute flight plans for the UAVs that incorporate these trajectories. The methods may also determine whether these trajectories intersect any obstacles, and at least attempt to reroute the trajectories around the obstacles. The methods may further include taking temporal events or airspaces into account such as Temporary Flight Restrictions, thusly incorporating a fourth dimension into calculations. These tools may also provide systems and computer-readable media containing software for performing any of the foregoing methods.

The features, functions, and advantages discussed herein may be achieved independently in various embodiments of the present description or may be combined in yet other embodiments, further details of which can be seen with reference to the following description and drawings.

BRIEF DESCRIPTION OF DRAWINGS

FIG. 6 is a block diagram illustrating examples of different levels of fidelity by which an aircraft performance model may model and calculate flight trajectories for the UAVs.

FIG. 7 is a block diagram illustrating scenarios for rerouting vehicles (e.g., UAVs) around a 3-D or 4-D obstacle while traveling between two or more destinations.

DETAILED DESCRIPTION

Figure 1:
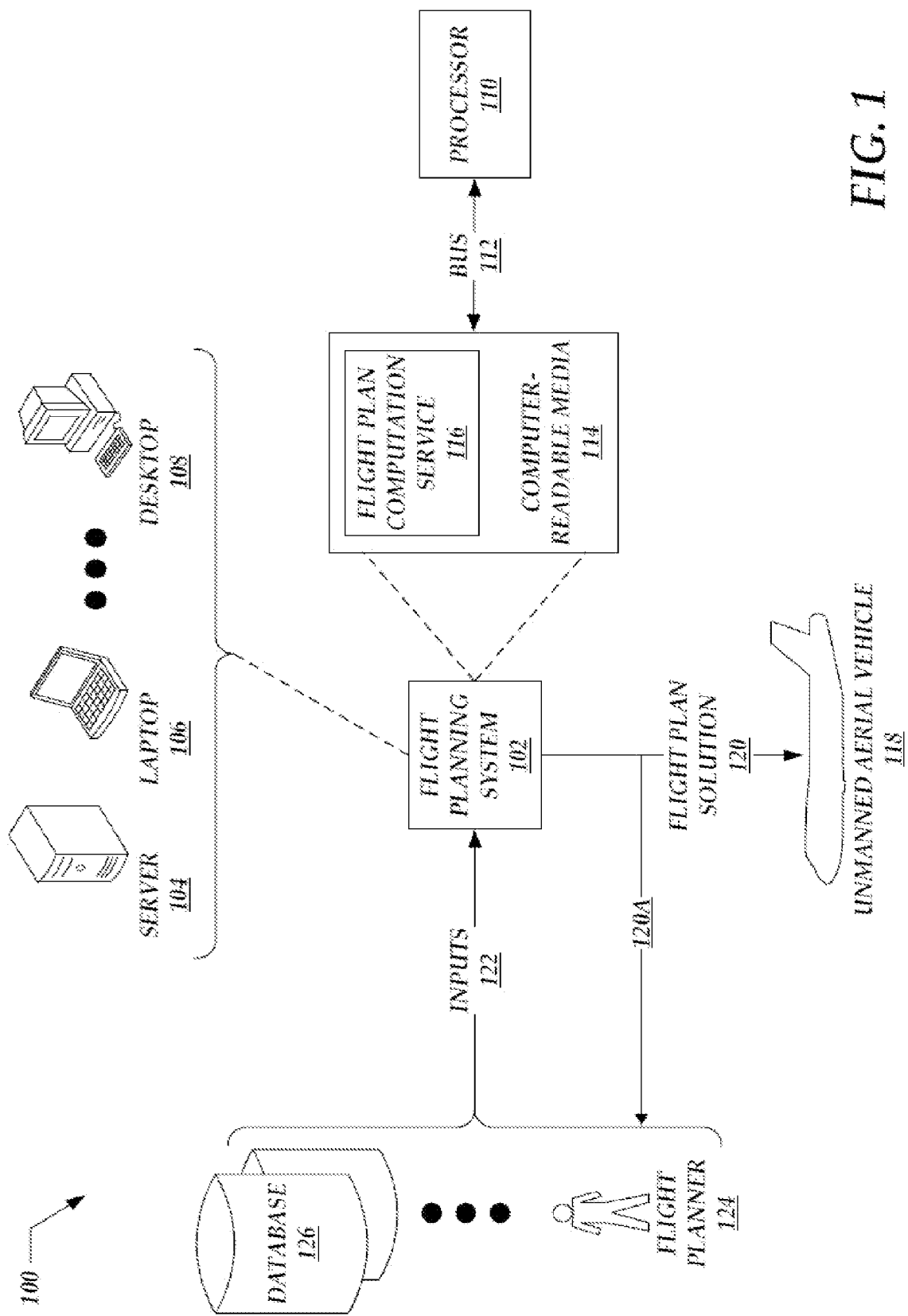
FIG. 1 is a block diagram illustrating systems or operating environments for computing flight plans for unmanned aerial vehicles (UAVs) while routing around obstacles having spatial and temporal dimensions.

The following detailed description discloses various tools and techniques for computing flight plans for vehicles such as unmanned aerial vehicles (UAVs) while routing around obstacles having spatial and temporal dimensions. Examples may include three spatial dimensions (e.g., x, y, and z coordinates) and temporal dimensions (e.g., t coordinates). Without limiting possible implementations, this description provides tools and techniques for planning routes or flights by which unmanned airborne vehicles may visit multiple destinations, while avoiding 4D obstacles that might otherwise interfere with the flight plans. This description begins with an overview, and then provides a detailed description of the attached drawings. As used herein, a vehicle may comprise, for example but without limitation, a UAV, a piloted aircraft (e.g., a fixed wing or a rotorcraft), a satellite, a ship, a boat, a submarine, a surface vehicle (e.g., an automobile), a robotic vehicle, an autonomous robotic vehicle, or other vehicle.

OVERVIEW OF THE DISCLOSURE

Given a set of destinations (e.g., airports) in 3-D physical space, or in 4-D time space, various tools and techniques described herein may calculate routes through 3-D or 4-D space that enable UAVs to visit the destinations. In some cases, the routes may return to the starting destination to complete a round-trip through the destinations. However, in other cases, the routes may not return to the starting destination. As described further herein, the tools and techniques may dynamically recalculate the routes to avoid any 3-D and/or 4-D obstacles or restrictions that are detected within any portion of the routes. In some cases, the tools and techniques may not find routes that visit all destinations while complying with any applicable constraints, and may report accordingly.

The routing algorithms may be described more formally as follows. Given:
    a finite set of destinations $D=\{d_1, d_2, \ldots d_n\}$,
    a cost function associated with traveling between any two adjacent destinations, $c(d_i, d_j)$, where $d_i, d_j$ are in the set of destinations D, and
    an upper bound, B, on the cost to traverse a circuit through the destinations (e.g., a Hamiltonian Circuit (HC)),
    then algorithms described herein attempt to find the least cost HC, if it exists. The solution is the ordered HC, $<d_1, d_2, \ldots d_n, d_1>$ (assuming a round-trip scenario, only for the sake of this example). The cost, C, of the circuit is defined as C=sum of $c(d_1, d_{i+1})$, for i=1 to n−1. In round-trip scenarios, the cost of the circuit may also include the cost to return to the starting destination, $c(d_n,d_1)$. C is constrained to be less than or equal to B, (i.e., C<=B).

Transforming this discussion to a 3-D graph, the set of destinations, paths between destinations, and the costs between destinations may form a weighted graph, G={D,E}. In this graph G, D represents the destinations, and E represents the set of edges, $e_{ij}=(d_i,d_j)$. It is anticipated that, because of the 3-D nature of the routing space, G will form a complete graph. Without limitation, and only to facilitate this description, the term "complete graph" may refer to a fully connected graph that defines a direct path from every vertex to every other vertex. In some implementations, the graph may be "complete" at the beginning of the processing described herein. However, the graph may afterwards become less than complete because of user initialization or other actions.

The cost function, c( ) as defined above, may include both the cost of the flight segment or edge between two destinations, and the cost of the destination itself. Therefore, the total edge cost is $c(d_i,d_j)=d_j+g(e_{ij})$, where the cost of a vertex is $d_j=v(d_j)$ and $g(e_{ij})$ is the cost of the edge containing the destination, $d_j$. The functions c( ) and g( ) are calculated in 4-D trajectory functions described further below.

A default set of costs for the destinations and edges may be input to the algorithms described herein. However, the algorithms may also calculate a dynamic set of costs as part of the 4-D trajectory function, if no default cost exists. The term "cost" as used herein may refer to the shortest distance, the least amount of time, or some other deterministic cost function. Without limitation, one example cost may include the time to fly between adjacent destinations. In this example, the algorithms described herein may calculate the least time trip to visit the destinations.

Obstacles may occur within the route, or may be added to it. These obstacles may include, but are not limited to, restricted airspace, National Air Space (NAS) classes of airspace to avoid, certain types of weather phenomena, or the like. The routing algorithms described herein may consider these obstacles when calculating the cost of a given route.

Continuing the previous example, and adding Class B airspace as an obstacle, the routing algorithms may calculate the least time route to at least some of the destinations, while avoiding Class B airspace. In some instances, adding obstacle constraints may result in an infeasible or non-attainable trip. For example, if one of the destinations is within a 3-D obstacle (e.g., Class B airspace), then the algorithm cannot reach this destination. In this case, the routing problem would have no solution, and the routing algorithms may indicate that no solution exists.

DESCRIPTION OF DRAWINGS

FIG. 1 illustrates systems or operating environments, denoted generally at 100, that provide flight plans for UAVs while routing around obstacles having spatial and temporal dimensions. These systems 100 may include one or more flight planning systems 102. FIG. 1 illustrates several examples of platforms that may host the flight planning system 102. These examples may include one or more server-based systems 104, one or more portable computing systems 106 (whether characterized as a laptop, notebook, or other type of mobile computing system), and/or one or more desktop computing systems 108. As detailed elsewhere herein, the flight planning system 102 may be a ground-based system that performs pre-flight planning and route analysis for the UAVs, or may be a vehicle-based system that is housed within the UAVs themselves.

Implementations of this description may include other types of platforms as well, with FIG. 1 providing non-limiting examples. For example, the description herein contemplates other platforms for implementing the flight planning systems, including but not limited to wireless personal digital assistants, smartphones, or the like. The graphical elements used in FIG. 1 to depict various components are chosen only to facilitate illustration, and not to limit possible implementations of the description herein.

Turning to the flight planning system 102 in more detail, it may include one or more processors 110, which may have a particular type or architecture, chosen as appropriate for particular implementations. The processors 110 may couple to one or more bus systems 112 that are chosen for compatibility with the processors 110.

The flight planning systems 102 may include one or more instances of computer-readable storage media 114, which couple to the bus systems 112. The bus systems may enable the processors 110 to read code and/or data to/from the computer-readable storage media 114. The media 114 may represent storage elements implemented using any suitable technology, including but not limited to semiconductors, magnetic materials, optics, or the like. The media 114 may include memory components, whether classified as RAM, ROM, flash, or other types, and may also represent hard disk drives.

The storage media 114 may include one or more modules 116 of instructions that, when loaded into the processor 110 and executed, cause the server 102 to provide flight plan computation services for a variety of UAVs 118. These modules may implement the various algorithms and models described and illustrated herein.

The UAVs 118 may be of any convenient size and/or type as appropriate for different applications. In different scenarios, the UAVs may range from relatively small drones to relatively large transport aircraft. Accordingly, the graphical illustration of the UAV 118 as shown in FIG. 1 is representative only, and is not drawn to scale.

The flight plan services 116 may generate respective flight plan solutions 120 for the UAVs 118 based on inputs 122, with flight planning personnel 124 and/or one or more databases 126 providing these inputs. The description below provides more specific examples of the various inputs 122.

Assuming that the flight plan services 116 define one or more solutions 120, the flight planning system 102 may load the solutions into the UAVs 118, as represented by the arrow connecting blocks 102 and 118 in FIG. 1. In addition, the flight planning system 102 may also provide the solutions 120 to the flight planner 124 and/or the databases 126, as denoted by the arrow 120a.

Having described the overall systems 100, the discussion now proceeds to a description of process flows for computing flight plans for UAVs while routing around obstacles having spatial and temporal dimensions. This discussion is now presented with FIG. 2.

Figure 2:
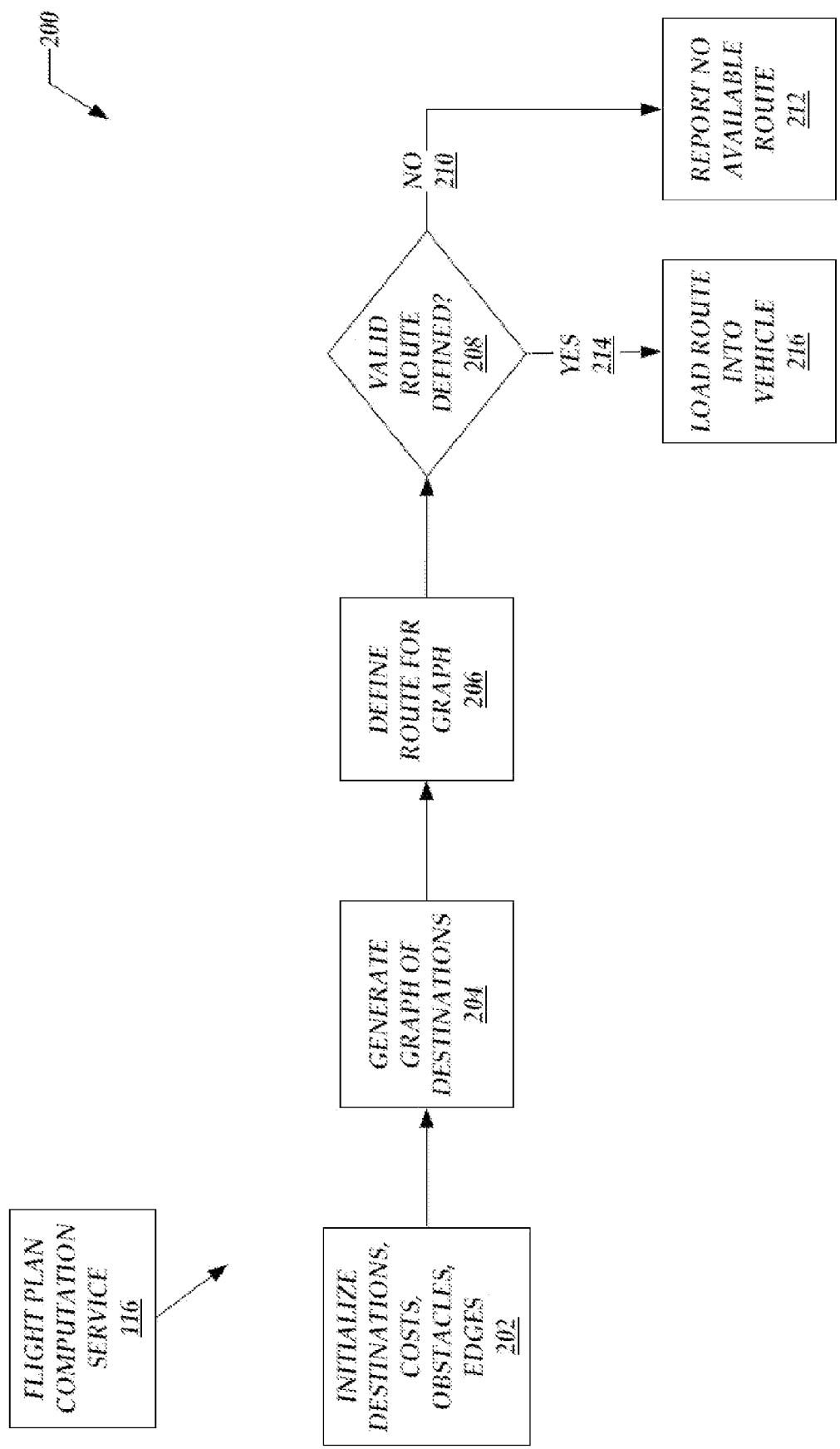
FIG. 2 is a flow diagram illustrating processes for computing flight plans for UAVs while routing around obstacles having spatial and temporal dimensions.

FIG. 2 illustrates process flows, denoted generally at 200, for computing flight plans as described herein. For ease of reference, but not to limit possible implementations, FIG. 2 may carry forward items described previously, and may denote them with the same reference numbers. For example, the flight computation service 116 may perform at least part of the process flows 200.

Turning to the process flows 200 in more detail, block 202 represents initializing a set of destinations to be visited by a UAV (e.g., 118 in FIG. 1). For example, block 202 may include receiving destinations specified by a human flight planner, and these destinations may or may not define a round-trip. As described further below, the process flows 200 may represent the destinations as vertices on a graph, and may represent routes between the destinations as edges on this graph.

Block 202 may include initializing a set of costs associated with the specified set of destinations. These costs may be associated with edges connecting destinations, or may be associated with the destination itself. In some cases, a user (e.g., the flight planner 124 in FIG. 1) may provide estimated default edge costs during the pre-flight planning stages. In other instances, cost algorithms as described herein may calculate actual costs based on a variety of different factors.

As noted above, costs may be associated with traveling between destinations, or may be associated with particular destinations themselves. Examples of costs associated with edges connecting destinations may include: time spent in traveling from one destination to another, speeds possible when so traveling, amounts of cargo available for transport, environmental factors associated with traveling between the destinations, carbon output by a flight vehicle when so traveling, and the like. Generally, the term "cost" as used herein may refer to any quantity that the flight plan service may represent numerically, with examples including, but not limited to, money, time, resources, or the like.

Planners may specify pre-flight costs or values associated with various edges in the graph. For example, if the planner wishes to preclude the UAV from traveling from destination A to destination B, the planner may specify an infinite cost associated with the edge that connects the destinations A and B. In some instances, planners may assign arbitrary costs to destinations. In such instances, any cost assigned by planners may become the fixed cost of the destination, and may override costs assigned to the destination by other means.

Examples of costs associated with a destination itself may include fixed costs associated with landing at a given destination, staying at the destination, departing from the destination, or the like. In addition, costs associated with the destination may include time constraints applicable to arriving at or departing from the destination. Thus, the notion of "cost" as described herein may be similar to the concept of "weight" from graph theory.

The cost algorithms described herein may also consider emergency landing points as a cost. For example, regulations applicable to flight paths flown by UAVs may specify that emergency landing points be available along these flight paths. The cost algorithms may evaluate whether emergency landing points are available within some specified distance of a given edge that represents one of these UAV flight paths. If the given edge has no emergency landing point within this distance, the cost algorithm may assign an infinite cost to this edge. This infinite cost may effectively preclude the UAV from traveling along the flight path represented by the given edge, thereby complying with these example regulations.

Block 202 may also include inputting representations of obstacles that may affect flights to/from the destinations. Generally, the term "obstacle" as used herein refers to any airspace that is off-limits to the UAVs, for reasons including, but not limited to, weather-related phenomena, regulations, traffic conditions, environmental factors, or the like. In different cases, these obstacles may or may not be defined with reference to ground-based features or structures (e.g., towers, building, or the like). Non-limiting examples of obstacles not defined with reference to ground-based features may include flights passing over areas subject to altitude restrictions (e.g., environmentally-sensitive or wilderness areas, high-population urban areas, or the like). In these examples, applicable regulations may mandate that such overflights exceed some given minimum altitudes, referred to herein as an "altitude floor". Within these restricted areas, obstruction algorithms described herein may model those altitudes falling below the applicable floor as obstacles. In some instances, UAVs may be subject to maximum altitude restrictions, referred to herein as an "altitude ceiling".

Generally, obstruction algorithms as described herein may model obstructions as three-dimensional volumes. In some cases, these obstruction models may be four-dimensional, to model cases in which the obstacles have a time component or dependency. Thus, the obstruction models as described herein may have spatial (e.g., x, y, and z) dimensions, and in some cases may have temporal dimensions (e.g., t).

Turning to temporal or time considerations in more detail, the obstruction algorithms described herein may model obstacles that have specific times of birth, and/or times of death. These models may also accommodate obstacles having particular durations or persistence, periodic or recurring births and deaths, or the like. Examples of such time-based obstacles may be temporary flight restrictions (TFRs), which may have specific times of birth and death. Other examples of time-dependent obstacles may include weather patterns (e.g., storm fronts) that are predicted to affect particular areas at particular times.

As another example of time-dependent obstacles, FAA rules may specify that airports associated with some destinations may not be accessible to UAVs if they are not tower-controlled. For example, if the control tower associated with a given airport closes at 8 p.m., then any destination associated with this given airport is within an obstacle as of 8 p.m. The obstruction algorithms may model these factors as time-dependent obstacles.

Other examples of four-dimensional obstacles may include other aircraft near a given UAV. Given an appropriate detection infrastructure, obstruction algorithms may dynamically detect another aircraft or other moving object, and reroute around it. These obstruction algorithms may be implemented, for example, on-board in the UAV. Examples of the detection infrastructure may include radar systems, transponders or sensors adapted to receive signals transmitted by the other aircraft, or the like.

In yet other examples, cost or obstruction algorithms may aggregate multiple other aircraft into a general 3-D or 4-D zone of congestion, modeled as costs and/or obstructions. For example, if a given area is highly congested, the algorithms may assign a correspondingly high cost to this area, thereby reducing the possibility of a flight solution passing through this congested area. In another example, the algorithms may model this highly congested area as an obstruction.

In another example, if the flight path of one or more aircraft is known and may be modeled in 3-D or 4-D coordinates, then the obstruction algorithms may model this flight path and the associated aircraft as an obstacle. Obstruction or obstacle detection algorithms described herein may also aggregate flight paths passing to or from a given airport into aircraft approach patterns or segments for the airport. In addition, these algorithms may model "keep out" zones as obstacles or obstructions. Generally, the various algorithms described herein may be applied within any convenient altitude within the atmosphere that is accessible to any type of UAV.

Block 204 represents generating a graph of the destinations specified in block 202. For example, block 204 may include building a database to store representations of the graph, of vertices representing the destinations, and of edges representing potential travel routes between the destinations. Such databases may be chosen to promote computational efficiency, and expedite I/O operations. Block 204 may include incorporating any constraints specified for various vertices or edges, or for the graph as a whole.

Block 206 represents defining at least one route through the graph generated in block 204. Block 206 may include, for example, executing a traveling salesman algorithm on the graph from block 204. Put differently, block 206 may include calculating a Hamiltonian Circuit for the graph. In possible implementations, block 206 may generate a flight plan solution (e.g., 120 from FIG. 1) for the graph generated in block 204. In different scenarios, the flight plan solution may or may not be the lowest-cost solution for the graph.

Previous implementations of traveling salesman algorithms typically do not consider weather factors when planning routes to multiple destinations, and do not model weather or wind factors prevailing at these different destinations as a cost associated with these destinations. In contrast, block 206 may include modeling weather and wind factors as they may impact time associated with traveling between different destinations. Further, these weather-related factors may be time-dependent, with different weather factors predicted to occur at different times during a given trip. Thus, block 206 may include considering these time-dependent factors (whether related to weather/meteorological factors or not), and optimizing the solution accordingly.

Figure 3:
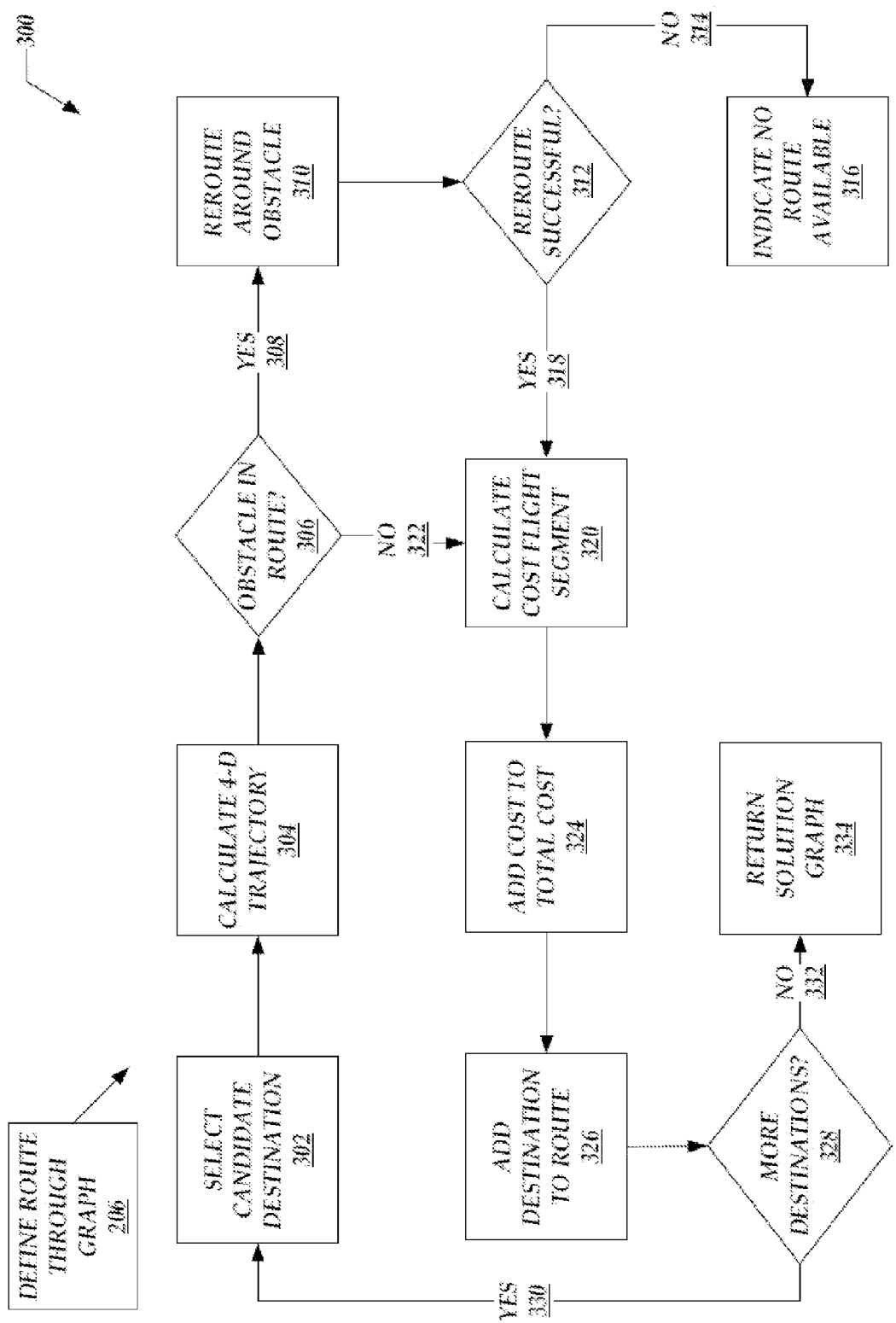
FIG. 3 is a flow diagram illustrating processes for defining routes through graph representations of destinations to be visited by UAVs.

FIG. 3, discussed below, elaborates further on illustrative processing performed in block 206. As described further below with FIG. 3, block 206 may or may not return a flight plan solution, depending on the circumstances of particular scenarios.

Block 208 represents evaluating whether block 206 returned a valid route or flight plan solution. If block 206 either did not return a solution, or did not return a valid solution, then the process flows 200 may take No branch 210 to block 212, which represents reporting that no route is available for the graph generated in block 204.

Returning to block 208, if block 206 returned a valid route, then the process flows 200 may take Yes branch 214 to block 216, which represents loading the route into a vehicle (e.g. the UAV 118 shown in FIG. 1). In turn, the vehicle may then travel to one or more destinations as indicated by the loaded route. Block 216 may include providing a flight solution as part of a flight plan that is loaded into the vehicle before launching the vehicle. However, in implementations that include sufficient processing power, the solution may dynamically guide the UAV in-flight, and in real time.

Turning now to FIG. 3, this drawing illustrates process flows 300 for defining at least one route through a graph representation of destinations and edges. For ease of reference, but not to limit possible implementations, FIG. 3 may carry forward items described previously, and may denote them with the same reference numbers. For example, FIG. 3 elaborates further on process block 206 from FIG. 2.

Turning to the process flows 300 more detail, block 302 represents selecting one of the destinations in a graph (e.g., as generated in block 204) as a candidate destination. For example, when beginning the process flows 300, block 302 may include selecting a starting point as defined within the graph.

Block 304 represents calculating a four-dimensional (4-D) trajectory from the destination selected in block 302 to another destination in the input graph, referred to herein as a flight segment. Block 304 may include using an aircraft performance model that simulates the performance of a given UAV (e.g., the UAV 118 shown in FIG. 1). The aircraft performance model may include parameters that describe the fundamental behavior of the aircraft. Examples of such parameters may include, but are not limited to:

Fuel consumption;
Minimum, normal, and maximum cruise speed;
Operations cost per time;
Environmental cost per time;
Standard rate of climb;
Standard rate of descent; and/or
Standard rate of turn.

The complexity of the aircraft performance model may vary in different implementations, with the model employing a level of fidelity or granularity that is commensurate with a level of fidelity specified for the flight segment. For example, all prop-driven aircraft may be modeled as a single category, all jet aircraft may be modeled as a single category, and the like. In another example, different respective aircraft may be modeled by model number, or even by tail number. In still other examples, individual aircraft may be modeled based on how they are loaded at a given time. Given a cost (e.g., a distance between two destinations), the aircraft performance model may calculate how long a given aircraft would take to fly that distance, given a variety of applicable constraints. These constraints may include, for example, maximum permitted speed, flight conditions, permitted altitude, amount of loading, and the like.

The aircraft performance model may use equations of motion, having the general form $\vec{d} = \vec{s} + \vec{v}t + \vec{a}t^2$, applied to 4-D space, where d represents distance, s represents initial distance, v represents velocity, a represents acceleration, and t represents time. The aircraft performance model may consider values including, but not limited to, one or more of the following:

Fuel consumption;
Green quality measures;
Time to maneuver;
    Coordinated 2-minute turns;
    Constant climb and decent rates;
Constant level flight speed; and/or
Position with respect to time in 3-D space.

Block 306 represents determining whether an obstacle or obstruction occurs within the flight segment computed in block 304. An obstacle determination algorithm may perform block 306 to determine if the current flight segment (e.g., represented as an edge in the input graph) intersects one or more obstacles (e.g., represented as constraint volumes).

Figure 5:
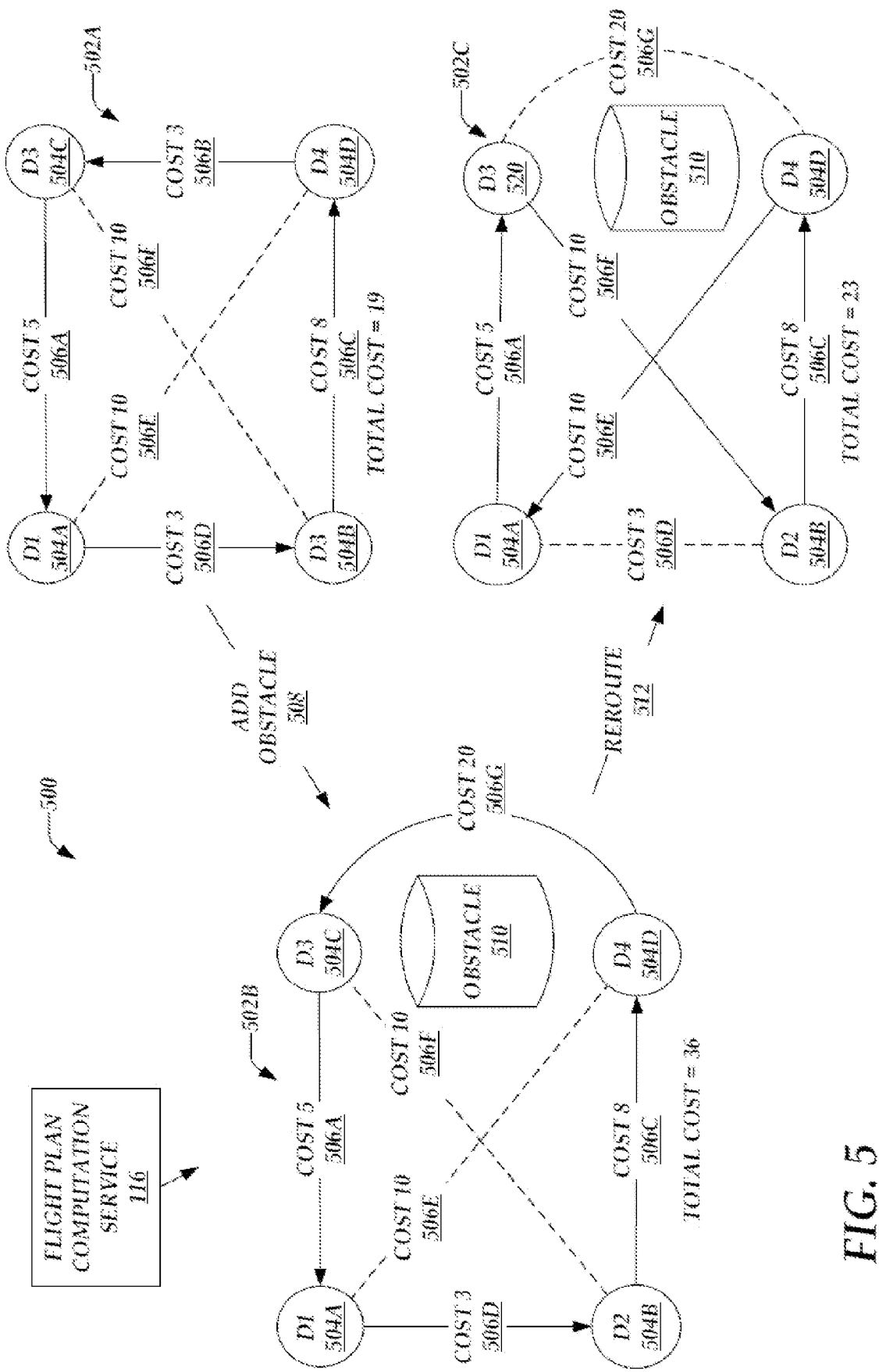
FIG. 5 is a block diagram illustrating techniques and examples of rerouting flight segments in response to obstacles occurring between destinations.

If block 306 determines that the trajectory of a flight segment intersects an obstacle, the process flows 300 may take Yes branch 308 to block 310, which represents rerouting around the obstacle, or reaching a current destination through a different route. Block 310 may include attempting to route around the obstacle, without exceeding any applicable upper bound on cost. More specifically, block 310 may include recalculating routes, or by maintaining the same route but flying around the obstacle. FIGS. 5 and 7 illustrate different examples of rerouting scenarios.

Block 312 represents determining whether the reroute operation performed in block 310 was successful. If the reroute was not successful, the process flows 300 may take No branch 314 to block 316, which represents reporting that no route is available for the input graph. Generally, if the process flows 300 cannot reach one of the destinations for any reason, the process flows 300 report that a solution is not available in block 316. For a variety of reasons, the process flows 300 may not be able to reach a given destination. For example, a user may specify an upper bound on the costs to be incurred in solving the input graph of destinations. However, the process flows 300 may not reach one or more of the destinations without exceeding the maximum specified cost. In another example, one or more destinations may lie within obstacles or obstructions, and therefore cannot be reached without passing through an obstruction. In other examples, intermediate obstacles or obstructions may prevent access to one or more destinations.

Returning to decision block 312, if block 310 is successful in avoiding the obstacle, then the process flows 300 may take Yes branch 318 to block 320, which represents calculating the cost of the current flight segment. If the current flight segment was a reroute, block 320 may include assigning the total weight of the new, rerouted path as the cost of the current flight segment.

Returning briefly to decision block 306, if no obstacle appears in the current flight segment, the process flows 300 may take No branch 322 directly to block 320. In this manner, the No branch 322 bypasses the rerouting block 310.

Block 324 represents adding the cost of the current flight segment to a total cost being calculated for the input graph. In turn, block 326 represents adding a current destination to a flight plan route being calculated for the input graph.

Decision block 328 represents evaluating whether more destinations remain to be processed in the input graph. If additional destinations remain to be processed, the process flows 300 may take Yes branch 330 to return to block 302. In turn, block 302 within select a next candidate destination from within the input graph, and the process flows 300 may repeat to process this next candidate destination, in a manner similar to that described previously.

Returning to decision block 328, if no more destinations remain in the input graph, the process flows 300 may take No branch 332 to block 334, which represents returning a solution graph. Block 334 may include calculating a total cost of the solution by summing all of the costs of the various flight segments. In addition, for respective pairs of adjacent destinations, the process flows 300 may sum the edge costs and destination costs associated with these destinations to obtain the total cost.

Having described the above process flows in FIGS. 2 and 3, the discussion proceeds to a description of data flows between databases and related models. This description is now presented with FIG. 4.

Figure 4:
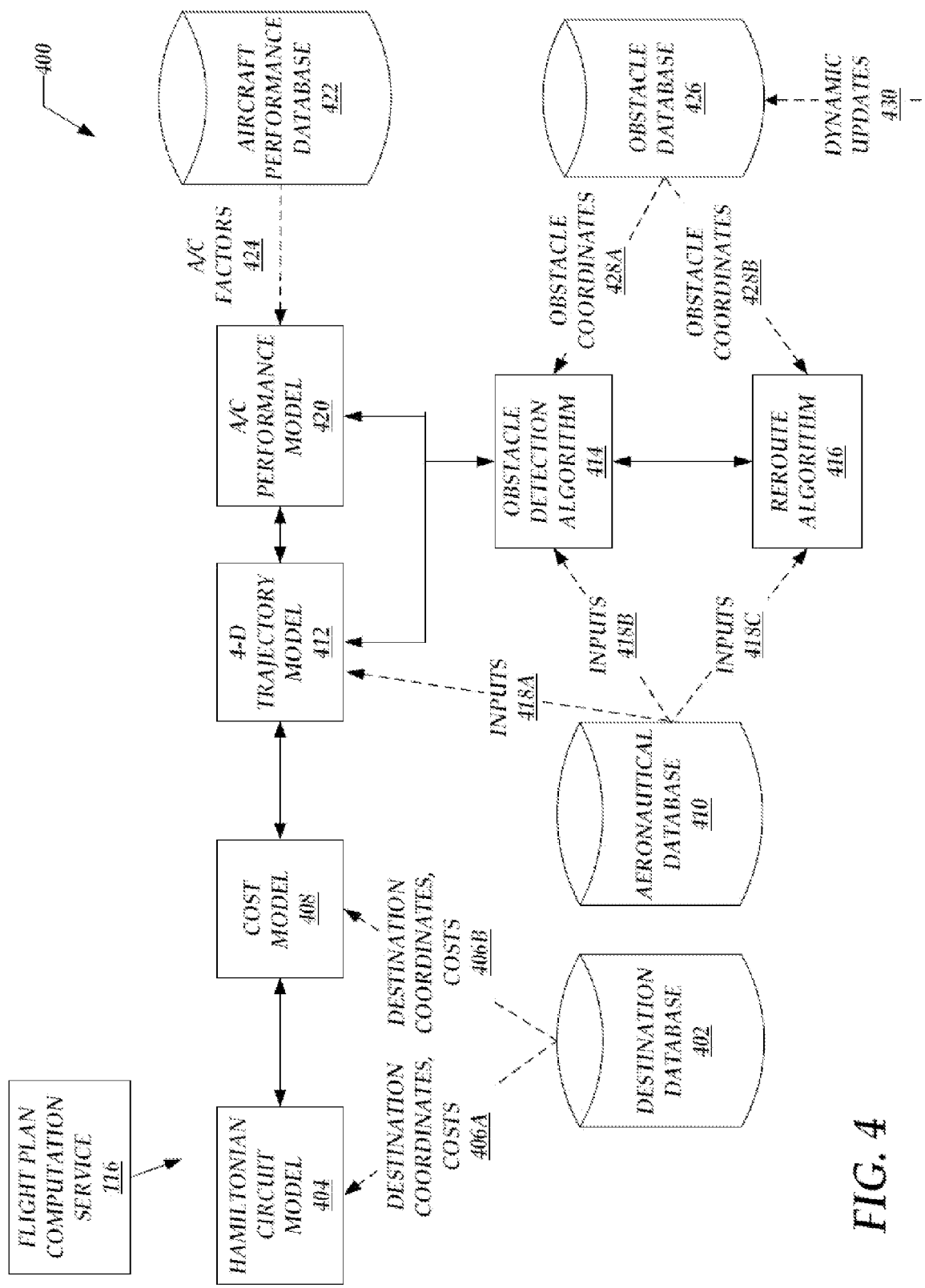
FIG. 4 is a combined block and data flow diagram illustrating databases, models, and data flows that may cooperate to compute flight plans.

FIG. 4 illustrates databases, models, and data flows 400 that are related to computing flight plans. For ease of reference, but not to limit possible implementations, FIG. 4 may carry forward items described previously, and may denote them with the same reference numbers. For example, various software modules provided by the flight computation service 116 may implement the algorithms, models, and data flows shown in FIG. 4. In addition, FIG. 4 provides several directed arrows representing illustrative data flows. However, these arrows are understood to be illustrative rather than limiting.

A destination database 402 may store data representing a plurality of different destinations, as expressed with respect to appropriate coordinate systems. The destination database may also store data representing costs associated with traversing or traveling between respective pairs of destinations. A route computation model 404 may receive destination coordinates and costs, denoted generally at 406a, in connection with defining solutions through input graphs (e.g. block 206 in FIGS. 2 and 3). The route computation model 404 may implement a Hamiltonian circuit, traveling salesman algorithm, or other suitable approaches. The route computation model may cooperate with a cost model 408, which also receives inputs from the destination database 402, with FIG. 4 denoting these inputs at 406b. The cost model 408 may, for example, perform the processing represented in blocks 320 and 324 in FIG. 3.

An aeronautical database 410 may include any subject matter typically represented on aeronautical maps or charts, including but not limited to representations of physical objects. More generally, this database may include representations of any realizable object of interest to the aeronautical community, expressed in three and possibly four dimensions. This database may include:

air-space definitions around particular airports,
approach and departure airways defined around certain airports,
navigation aids that may include fixed or abstract waypoints that provide reference points for reporting locations,
airport information including radio communication frequencies and times/days of operation,
separation data between vehicles,
areas restricted due to environmental factors,
"green" areas subject to standards governing carbon dioxide emissions or minimum altitudes for overflights,
"keep out" zones (whether absolute or not), or the like.

As indicated in the example shown in FIG. 4, the aeronautical database 410 may provide inputs to 4-D trajectory model 412, an obstacle detection algorithm 414, and a reroute algorithm 416. FIG. 4 denotes these inputs respectively at 418a, 418b, and 418c.

Turning to the 4-D trajectory model 412 in more detail, this model may cooperate with an aircraft performance model 420 to perform the processing represented in block 304 in FIG. 3. Generally, the trajectory model may determine, for example, how the UAV is to travel from destination to destination, and may define factors such as altitude of flight turning maneuvers, times of departure, and the like. In turn, the aircraft performance model 420 may receive information from an aircraft performance database 422, which may store data representing performance characteristics of a variety of different aircraft, including for example the UAV 118 shown in FIG. 1. The aircraft performance model may query for and receive aircraft performance factors denoted generally at 424.

The obstacle detection algorithm 414 and the reroute algorithm 416 may perform the processing represented at blocks 306 and 310 in FIG. 3. To do so, these two algorithms 414 and 416 may receive inputs from an obstacle database 426, which may store volumetric representations of obstacles or obstructions. Upon request, the obstacle database 442 may provide the coordinates of obstacles to the detection algorithm 414 and the reroute algorithm 460, with these coordinates denoted respectively at 428a and 428b. As described elsewhere herein, the obstacle database 426 may include representations of 3-D and/or 4-D obstacles.

The obstacle detection algorithm 414 determines if the current flight segment (edge) intersects a constraint volume (obstacle). In some implementations, the obstacle detection algorithm may model the current flight segment as a linear line within 3-D space. Other implementations may consider an arbitrary non-linear polynomial line. Calculation of a line segment with a volume may use standard calculations from solid geometry.

As indicated in FIG. 4, the obstacle database 426 may receive dynamic updates 430, with these updates indicating changes in obstacles as they may occur over time. For example, the obstacle database 426 may be updated with changing weather conditions, flight restrictions, airspace closures, or the like. In this manner, the obstacle database 426 may enable the obstacle detection algorithm 414 and the reroute algorithm 416 dynamically to update flight plans in response to changing conditions.

Having described the algorithms, models and databases shown in FIG. 4, the discussion now proceeds to a description of rerouting flight segments to account for obstacles appearing between destinations. This description is now presented with FIG. 5.

FIG. 5 illustrates techniques and examples, denoted generally at 500, of rerouting flight segments in response to obstacles detected between destinations. For ease of reference, but not to limit possible implementations, FIG. 5 may carry forward items described previously, and may denote them with the same reference numbers. For example, the flight computation service 116 may perform the rerouting techniques shown in FIG. 5.

FIG. 5 illustrates an initial flight plan or routing 502a that includes four destinations D1-D4, denoted respectively at 504a, 504b, 504c, and 504d. Assuming a graph representation of the flight plan 502a, the four destinations D1-D4 may appear as vertices within that graph. FIG. 5 also illustrates costs or weights associated with traveling between these different destinations, as denoted respectively at 506a-506f. The initial flight plan 502a provides for the vehicle making a round trip beginning at the destination D1, passing through the destinations D2, D4, D3, and returning to the starting point D1 as indicated.

While the examples shown in FIG. 5 illustrate roundtrips, it is noted that the description herein is not limited to round-trip scenarios, but may also be practiced in implementations that calculate "shortest partial trip" scenarios that are not complete roundtrips. Thus, the algorithms described herein may stop at any destination within a given route, resulting in a type of directed graph connecting multiple destinations or points (i.e., "shortest trip" implementations). For convenience, and not limitation, in illustrating the different flight path scenarios, FIG. 5 denotes flight segments that are selected for the route as solid arrows, and denotes non-selected flight segments in dashed line.

In the initial flight plan 502a, the four selected trip segments have a total weight of 19. However, assume that an obstacle is detected between the destinations D3 and D4, as represented generally at 508. In this case, the techniques described herein would alter the flight plan 502a to a flight plan as shown at 502b. The flight plan 502b depicts the obstacle 510 between the destinations D3 and D4. From the destination D4, referring briefly back to FIG. 3, the decision block 306 may detect the obstacle 510, and take Yes branch 308 to block 310 to reroute around the obstacle. Assuming that block 310 may reroute around the obstacle to reach the destination D3 as shown, the cost of avoiding the obstacle 510 may increase to 20, as denoted at 506g in FIG. 5. In this example, the total cost of the flight plan 502b would increase to 36.

Assuming that this increased cost of 36 exceeds a specified upper bound, the flight plan 502b may be rerouted (as represented generally at 512), thereby transitioning to a final flight plan 502c. As shown in FIG. 5, the flight plan 502c adjusts the order in which the vehicle visits the destinations, beginning at destination D1, proceeding as shown to destinations D3, D2, D4, and then returning to destination D1. The total cost of the final flight plan 502c is 33, which is assumed to be acceptable.

Having described the examples of obstacle detection and rerouting as shown in FIG. 5, the discussion now proceeds to a description of different levels of fidelity possible for flight trajectory calculations. This description is now presented with FIG. 6.

FIG. 6 illustrates examples, denoted generally at 600, of different levels of fidelity by which an aircraft performance model (e.g., 420 in FIG. 4) may model and calculate flight trajectories for a given UAV. For ease of reference, but not to limit possible implementations, FIG. 6 may carry forward items described previously, and may denote them with the same reference numbers. For example, FIG. 6 carries forward the aircraft performance model 420 from FIG. 4, and carries forward the two destinations D1 and D2, referenced at 504a and 504b. FIG. 6 shows variations in the vertical profile of a trajectory for convenience. It is assumed that lateral changes, i.e. changes in x, y direction, may be allowed as well.

FIG. 6 provides examples of simple flight trajectory models 602a, in which the vehicle is assumed to travel between the two destinations at a fixed level (denoted at 604a-d, for the purposes of discussing the different models in FIG. 6), without gaining or losing altitude (denoted at 606) during the trip. This model may estimate the cost associated with traveling between the two destinations by a linear calculation that does not account for climbing to and descending from some altitude during the trip.

FIG. 6 illustrates simple linear trajectory models 602b, in which the vehicle is assumed to travel between the two destinations while climbing to and descending from a given altitude. This approach assumes that speed, rate of climb, rate of descent, and turns are modeled as linear equations. Cost estimates using this model may account for the time (modeled linearly) involved in climbing to and descending from this given altitude.

FIG. 6 provides examples of simple non-linear trajectory models 602c, in which the vehicle trajectory is modeled as a non-linear flight climbing to and descending from some given altitude. The models 602c may use non-linear equations to estimate costs associated with traveling between the two destinations.

FIG. 6 illustrates of complex non-linear trajectory models 602d, in which the vehicle trajectory is modeled as a flight climbing to and descending from several different altitudes when traveling between the two destinations. The models 602d may use non-linear equations to estimate costs associated with traveling between the two destinations at a plurality of different altitudes, and traveling for different amounts of times at the different altitudes.

Having described the examples of the trajectory models in FIG. 6, the discussion now proceeds to a description of routing around an obstacle. This description is now presented with FIG. 7.

FIG. 7 illustrates scenarios, denoted generally at 700, for rerouting a vehicle (e.g., a UAV) around a 3-D or 4-D obstacle while traveling between two or more destinations. For ease of reference, but not to limit possible implementations, FIG. 7 may carry forward items described previously, and may denote them with the same reference numbers. For example, FIG. 7 carries forward the reroute algorithm 416 from FIG. 4, and carries forward the two destinations D1 and D2, referenced at 504a and 504b.

FIG. 7 illustrates two views of a reroute scenario, in which a vehicle traveling from a first destination (e.g., 504*a*) to a second destination e.g., 504*b*) is rerouted around at least one obstruction. In the example shown in FIG. 7, this obstruction is a restricted airspace zone, denoted generally at 702. A top view 700*a* provides a top-down view of the reroute scenario, and a second view 700*b* provides a more perspective view of the reroute scenario.

Given an obstacle that intersects the trajectory, the reroute algorithm may calculate the edge costs to avoid the obstacle. The reroute algorithm may consider the shape, location, as well as the size of the obstacle, and the aircraft performance model applicable to the UAV. In some instances, the reroute algorithm may determine a viable path around the obstacle. The reroute algorithm may attempt to reroute laterally and/or vertically to achieve a rerouting solution. In some cases, the reroute algorithm may attempt lateral reroutes before attempting to altitude reroutes. The algorithm may use the total weight of the new path as the weight of the new edge to the destination vertex.

The rerouting algorithm may cooperate with the obstacle detection algorithm to determine any points of intersection between the current flight path and the obstacle. A non-limiting example follows:

1. Query an obstacle database (e.g., 426 shown in FIG. 4) for the shape and 3-D ordinates of obstacles. In pre-flight planning applications, the locations of existing static obstacles may be known, and stored in the database. Where the algorithm is implemented in a real-time flight deck scenario, then the algorithm may locate the obstacle using, for example, sensors or other means for receiving real-time information.
2. Determine a new or rerouted flight path around the obstruction. The obstacle database may contain 3-D descriptions of obstacles, as well as locations of obstructions in 4-D space. Since the obstacle database stores spatial coordinates and shapes for the obstacle, the obstacle detection algorithm may determine the 4-D point at which the current 3-D trajectory intersects with the obstacle. Solid geometry techniques may calculate the intersection of a line (representing the trajectory) with a solid object (representing the obstacle). Depending on the type and shape of the obstacle, the rerouting algorithm chooses a next point in space to clear the obstacle. Once the rerouting algorithm determines this next point, it may call the aircraft performance model to fly the aircraft to this point, and may call the cost model to determine the cost of this next flight segment. If the reroute algorithm can now reach the destination without intersecting the obstacle, then the cost model may calculate the new cost of this segment using the aircraft performance model.
3. Add the new or rerouted path to the old path, by replacing the segment that intersects the obstacle with a new segment incorporating the new path.
4. Calculate the cost of the new flight path.
5. Return the new path and the new cost.

Turning to the top view 700*a* in more detail, this view provides an example in which the reroute algorithm redirects to the UAV laterally to the right to avoid the obstruction 702. FIG. 7 denotes the rerouted trajectory at 704*a*, and denotes the original trajectory at 704*b*.

It is noted that while FIG. 7 and other drawings herein may illustrate obstructions as cylinders, implementations may approximate or model these obstructions using any suitable volumetric shape, and the cylindrical representation is provided only for ease of illustration. More specifically, obstacles may be modeled as ellipsoids, elliptic cones, as well as cylinders or other shapes, or combinations of the foregoing. In some instances, obstacles may be modeled as planes, lines, and/or points, alone or in connection with volumetric models.

Turning now to the perspective view 700*b* in more detail, the obstruction 702*a* is expanded to show three different zones of obstruction, for example only but not limitation. A zone of restricted airspace 702*a* appears at a relatively high altitude. A zone of non-restricted airspace 702*b* appears below the restricted zone 702*a*, and a second zone of restricted airspace 702*c* appears below the non-restricted airspace 702*b*.

In the example shown, the vehicle may climb to a particular altitude 706, and proceed along the trajectory 704*a*, as denoted at a segment 708. In the example shown, the altitude 706 is assumed to pass through the restricted airspace zone 702*a*, thereby indicating that a reroute is in order. Accordingly, at a point 710, the vehicle is rerouted around the restricted airspace zone by adjusting its trajectory laterally to the right (as shown in the view 700*a*), and by reducing its altitude to a second, lower altitude 712. In the example shown, the lower altitude 712 passes through the non-restricted airspace zone 702*b*, and is therefore permissible. At a next point 714, having passed through the non-restricted airspace zone 702*b*, and having cleared the restricted airspace zone 702*a*, the reroute algorithm for 16 may return the UAV to the original altitude 706. In response to the reroute, the trajectory would climb from the point 714 to a leveling-off point 716. Afterwards, the trajectory would reach a descent point 718, and the UAV would eventually land at the second destination 504*b*.

The subject matter described above is provided by way of illustration only and does not limit possible implementations. Various modifications and changes may be made to the subject matter described herein without following the example embodiments and applications illustrated and described, and without departing from the true spirit and scope of the present description, which is set forth in the following claims.

The invention claimed is:

1. A method for computing a route for a vehicle, the method comprising:
   generating, by action of a processor of a flight processing system, a graph of a plurality of destinations to be visited by the vehicle;
   determining, by action of the processor, a route through the graph by:
      calculating a Hamiltonian circuit for the graph by at least:
         defining segments of the route through the graph by:
            selecting by action of the processor a first destination and a second destination from among the plurality of destinations;
            calculating by action of the processor a trajectory between the first destination and the second destination; and
            adding by action of the processor the first destination and the second destination to the route, when the trajectory does not intersect at least one obstacle from among a plurality of obstacles;
   determining whether the route is a valid route by action of the processor; and
   after determining that the route is a valid route, loading the route into the vehicle sending by action of the flight planning system.

2. The method of claim 1, wherein calculating the trajectory between the first destination and the second destination comprises calculating the trajectory based on a performance model for the vehicle.

3. The method of claim 1, further comprising rerouting around the at least one obstacle, when the trajectory intersects the at least one obstacle.

4. The method of claim 1, further comprising after determining that the route is not a valid route, indicating no route is available.

5. The method of claim 1, wherein determining the route through the graph further comprises:
rejecting one or more segments of the route, when a cost for the route exceeds a specified upper bound.

6. The method of claim 1, further comprising determining by action of the processor a cost for the route based on at least one member selected from the group consisting of: a weather factor, a wind factor, a traveling time, a speed, an amount of available cargo, an environmental factor, and a carbon output.

7. The method of claim 1, further comprising specifying the plurality of obstacles and the trajectory in at least three dimensions.

8. The method of claim 7, wherein the at least three dimensions comprise a fourth dimension representing time.

9. The method of claim 1, wherein defining the segments of the route comprises defining the segments of the route by executing a traveling salesman algorithm on the graph.

10. The method of claim 1, wherein the vehicle comprises an aircraft, and, wherein the plurality of obstacles comprise one or more of: an obstacle related to restricted airspace and an obstacle related to weather phenomena.

11. A system for computing a route for a vehicle, the system comprising:
a flight planning system, comprising:
a processor; and
one or more non-transitory computer-readable storage media that include computer-readable instructions that, when executed by the processor, cause the processor to:
generate a graph of a plurality of destinations to be visited by the vehicle;
determine a route through the graph by:
calculating a Hamiltonian circuit for the graph by at least:
defining segments of the route through the graph by:
selecting a first destination and a second destination from among the plurality of destinations;
calculating a trajectory between the first destination and the second destination; and
adding the first destination and the second destination to the route, when the trajectory does not intersect at least one obstacle from among a plurality of obstacles; and
determine whether the route is a valid route; and
after determining that the route is a valid route, loading the route into the vehicle.

12. The system of claim 11, wherein the route definition module is further operable to reroute around the at least one obstacle, when the trajectory intersects the at least one obstacle.

13. The system of claim 11, wherein the route definition module is further operable to reject one or more segments of the route, when a cost for the route exceeds a specified upper bound.

14. A non-transitory computer-readable storage medium comprising computer-executable instructions for performing a method for computing a route for a vehicle, the method executed by the computer-executable instructions comprising:
generating by action of a processor of a flight processing system, a graph of a plurality of destinations to be visited by the vehicle;
determining a route through the graph by:
calculating a Hamiltonian Circuit of the graph by at least:
defining segments of the route through the graph by action of the processor by:
selecting by action of the processor a first destination and a second destination from among the plurality of destinations;
calculating by action of the processor a trajectory between the first destination and the second destination; and
adding by action of the processor the first destination and the second destination to the route, when the trajectory does not intersect at least one obstacle from among a plurality of obstacles;
determining whether the route is a valid route; and
after determining that the route is a valid route, loading the route into the vehicle.

15. The non-transitory computer-readable storage medium of claim 14, the method executed by the computer-executable instructions further comprising:
after determining that the route is not a valid route, indicating no route is available.

16. The non-transitory computer-readable storage medium of claim 14, the method executed by the computer-executable instructions further comprising, rerouting around the at least one obstacle, when the trajectory intersects the at least one obstacle.

17. The non-transitory computer-readable storage medium of claim 14, wherein determining the route through the graph comprises selecting the segments of the route based on a cost of each of the segments.

18. The non-transitory computer-readable storage medium of claim 17, wherein determining the route through the graph comprises rejecting one or more segments of the route, when a cost of the route exceeds a specified upper bound.

19. The system of claim 11, wherein determining the route through the graph comprises selecting the segments of the route based on a cost of each of the segments.

20. The system of claim 11, wherein determining the route through the graph comprises determining the route by executing a traveling salesman algorithm on the graph.

* * * * *